US 9,391,862 B2
Jul. 12, 2016

(12) United States Patent
Zhou (10) Patent No.: US 9,391,862 B2
(45) Date of Patent: Jul. 12, 2016

(54) METHOD AND APPARATUS FOR SCHEDULING A SERVICE PROCESSING RESOURCE (71) Applicant: Huawei Technologies Co., Ltd., Shenzhen (CN)

(72) Inventor: Jianhua Zhou, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 266 days.

(21) Appl. No.: 14/024,720

(22) Filed: Sep. 12, 2013

(65) Prior Publication Data

US 2014/0012985 A1 Jan. 9, 2014

Related U.S. Application Data (63) Continuation of application No. PCT/CN2011/075760, filed on Jun. 15, 2011.

(51) Int. Cl.
*H04L 12/26* (2006.01)
*H04L 29/08* (2006.01)
(Continued)

(52) U.S. Cl.
CPC .......... *H04L 43/0876* (2013.01); *G06F 9/5083* (2013.01); *H04L 67/32* (2013.01); *H04L 69/24* (2013.01)

(58) Field of Classification Search
CPC ............ H04L 41/5025; H04L 41/5054; H04L 41/0609; H04L 43/10; G06F 11/3409; G06F 9/5072; G06F 17/30575
USPC ........................................................ 709/224
See application file for complete search history.

(56) References Cited

U.S. PATENT DOCUMENTS 7,660,887 B2 * 2/2010 Reedy .................... G06F 9/542
709/223
2004/0215987 A1 10/2004 Farkas et al.
(Continued)

FOREIGN PATENT DOCUMENTS

CN 1361606 A 7/2002
CN 1468010 A 1/2004
(Continued)

OTHER PUBLICATIONS

Foreign Communication From a Counterpart Application, European Application No. 11867757.4, Extended European Search Report dated Dec. 20, 2013, 7 pages.
(Continued)

*Primary Examiner* — Ruolei Zong
(74) *Attorney, Agent, or Firm* — Conley Rose, P.C.; Grant Rodolph; Adam J. Stegge (57) ABSTRACT A method for scheduling a service processing resource, includes: setting multiple processing capability ranks of a processing resource and marking actual processing capability corresponding to each processing capability rank for the processing resource separately; calculating the service fluctuation quantity according to a change of the actual service quantity processed by the processing resource; calculating, according to the service fluctuation quantity, a reserved idle processing capability for eliminating an effect from a service fluctuation; and circularly scheduling the processing capability ranks of the processing resource according to the actual processing capability marked by each processing capability rank, wherein the reserved idle processing capability, service fluctuation quantity, and service quantity are to be processed.

22 Claims, 8 Drawing Sheets (51) Int. Cl.
*G06F 9/50* (2006.01)
*H04L 29/06* (2006.01)

(56) References Cited

U.S. PATENT DOCUMENTS

| | | | |
|---|---|---|---|
| 2005/0172291 A1* | 8/2005 | Das | G06F 9/5083 718/104 |
| 2007/0112723 A1 | 5/2007 | Alvarez et al. | |
| 2008/0225714 A1 | 9/2008 | Denis | |
| 2010/0238802 A1* | 9/2010 | Lei | H04L 41/5006 370/230.1 |

FOREIGN PATENT DOCUMENTS

| | | | |
|---|---|---|---|
| CN | 1518278 A | 8/2004 |
| CN | 1787684 A | 6/2006 |
| CN | 101409896 A | 4/2009 |
| WO | 2004080104 A1 | 9/2004 |
| WO | 2006045337 A1 | 5/2006 |

OTHER PUBLICATIONS

Foreign Communication From a Counterpart Application, Chinese Application No. 201180001698.3, Chinese Search Report dated Feb. 5, 2013, 2 pages.

Foreign Communication From a Counterpart Application, PCT Application No. PCT/CN2011/075760, Chinese Search Report dated Mar. 15, 2012, 6 pages.

Foreign Communication From a Counterpart Application, PCT Application No. PCT/CN2011/075760, Chinese Written Opinion dated Mar. 15, 2012, 3 pages.

\* cited by examiner

```
Calculate the predicted service quantity L_prediction in the next time range,
assuming that the processing capability rank of a current processing resource is
R_m.
```
— 501

```
When L_prediction >= L_m - ΔL_extra_m, switch the current processing capability rank of
the processing resource to the higher processing capability rank (R_m+1). Or, when
L_prediction < L_{m-1} - ΔL_extra_{m-1}, switch the current processing capability rank of the
processing resource to the lower processing capability rank. Otherwise, the
current processing capability rank of the processing resource remains unchanged,
that is, R_next = R_m.
```
— 502

METHOD AND APPARATUS FOR SCHEDULING A SERVICE PROCESSING RESOURCE

CROSS-REFERENCE TO RELATED APPLICATIONS

This application is a continuation of International Application No. PCT/CN2011/075760, filed on Jun. 15, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present application relates to the field of communications technology, and in particular, to a method and an apparatus for scheduling a service processing resource.

BACKGROUND

On the live network that is deployed on the communication network, a service processing resource on each network element is configured according to the maximum service peak value. However, the service quantity that needs to be actually processed is not always the peak value and changes with time. Therefore, a processing resource of each network element is not enough and is in idle state most of the time, which affects performance and causes a great waste of performance and power consumption. To eliminate the waste, the communication system starts to use a method for tracing the service load (L) to dynamically adjust a processing capability rank ($R_n$) of a service processing resource.

First, a series of multiple processing capability ranks $R_0$, $R_1$, ..., $R_n$ are set for a processing resource. The processing resource provides processing capabilities $L_0$, $L_1$, ..., $L_n$ that meet the service load of a specified rank for each processing capability rank. Service processing capability sequences $L_0$ to $L_n$ corresponding to processing capability ranks $R_0$ to $R_n$ are discretely distributed in ascending order. The rank spacing, division mode, and processing capability of each processing capability rank are determined by the hardware structure and working principle. For example, the quantities of processing resources of different processing capability ranks are in proportion to the numbers or combinations of hardware such as processing boards, channels, and chips in working state. That is, the higher the configured processing resource capability is, the more the required resources are. Therefore, when the processing resource has a lower processing capability rank $R_{n-m}$, excess processing capabilities can be disabled or in standby power consumption state to save energy.

The current method for scheduling a service processing resource is to set a processing capability rank of a processing resource based on service quantities and after the processing capability rank is created and the service quantities are classified. For example, a prediction algorithm is used to obtain the predicted service quantity $L_{\_prediction}$ in the next time period based on service quantities in previous time periods. Then, the processing capability rank, $R_{\_next}$ of the processing resource, is set according to $L_{\_prediction}$.

Because services on the communication network fluctuate inevitably, to offset service fluctuation on the service quality, certain processing resource capability needs to be reserved, which is often set according to the experience data. The reserved processing resource capability is generally converted to the service quantity $\Delta L_{extra}$. After an interval, when $L_n > (L_{\_prediction} + \Delta L_{extra}) > L_{n-1}$, the processing capability of the processing resource in the next time period is set according to the formula $R_{\_next} = R_n$.

However, the existing $\Delta L_{extra}$ is set to a fixed value according to the experience data. Because of differences between usage scenarios and network elements, the following problems may occur after the next time period is reached. Assume that the current service quantity is $L_{\_current}$ and the actual service quantity fluctuation is $\Delta L$. The first problem is that the reserved $\Delta L_{extra}$ is not enough. For example, when the current processing capability rank of a processing resource is $R_1$, $L_{\_current} + \Delta L_{extra} < L_1$, $(L_{\_current} + \Delta L_{extra})$ may exceed the load capability $L_1$ of the processing capability rank $R_1$. As a result, the processing capability is not enough and the service suffers from loss. The second problem is that the reserved $\Delta L_{extra}$ is too much. When the current processing capability rank of a processing resource is $R_2$, though $L_{\_current} + \Delta L < L_1$, but due to $L_{\_current} + \Delta L_{extra} >= L_1$, the processing capability rank of the processing resource is set to $R_2$ according to the algorithm, rather than the more proper processing capability rank $R_1$. The processing capability rank of the processing resource is set to $R_2$ according to the algorithm, but not the more proper processing capability rank $R_1$. As such, there is a great waste of the processing capability.

SUMMARY

The embodiments of the present application provide a method and an apparatus for scheduling a service processing resource to solve the following problem that is caused by the improper existing method for scheduling a service processing resource: processing capabilities are insufficient sometimes, and in some instances, there is a great waste of processing capabilities on the communication network.

An embodiment of the present application provides a method for scheduling a service processing resource, including: setting multiple processing capability ranks of a processing resource and marking actual processing capabilities that correspond to the processing capability ranks of the processing resource, respectively; calculating a service fluctuation quantity according to a change of an actual service quantity processed by the processing resource; calculating, according to the service fluctuation quantity, a reserved idle processing capability for eliminating the effect from a service fluctuation; circularly scheduling the processing capability ranks of the processing resource according to the actual processing capability marked by each processing capability rank, the reserved idle processing capability, the service fluctuation quantity, and a service quantity to be processed.

An embodiment of the present application provides an apparatus for scheduling a service processing resource, including a processing resource module, a service monitoring module, a statistical calculation module, and a calculation scheduling module, wherein, the statistical calculation module is configured to mark each processing capability rank of the processing resource module and an actual processing capability of each processing capability rank according to service data collected by the service monitoring module; the statistical calculation module is configured to calculate a service fluctuation quantity according to service quantity change data collected by the service monitoring module, and calculate, according to the service fluctuation quantity, a reserved idle processing capability for eliminating the effect from a service fluctuation; the calculation scheduling module is configured to circularly schedule the processing capability ranks of the processing resource module according to the actual processing capability marked by each processing capability rank, the reserved idle processing capability, the service fluctuation quantity, and a service quantity to be processed.

The aforementioned method, apparatus, or network element for scheduling a service processing resource uses a mathematic statistical mean to calculate a service fluctuation quantity, and then properly selects an appropriate proper reserved quantity of the processing resource based on the calculation result of the service fluctuation quantity, preventing drawbacks of experience judgment. A scientific statistical result is used as the basis for properly scheduling a service processing resource, implementing self-adaptability between resources and loads to meet certain Quality of Service (QoS) requirements, and therefore, preventing the impact on the network service processing capability due to insufficient processing capabilities caused by improper resource scheduling or a waste of processing resources due to excess processing capabilities.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description are merely some embodiments of the present invention, and persons of ordinary skill in the art may further obtain other drawings according to these accompanying drawings without creative efforts.

DETAILED DESCRIPTION

The following clearly describes the technical solutions in the embodiments of the present application with reference to the accompanying drawings in the embodiments of the present application. Apparently, the described embodiments are merely a part rather than all of the embodiments of the present application. All the other embodiments obtained by persons skilled in the art based on the embodiments of the present application shall fall within the protection scope of the present application.

Figure 1:
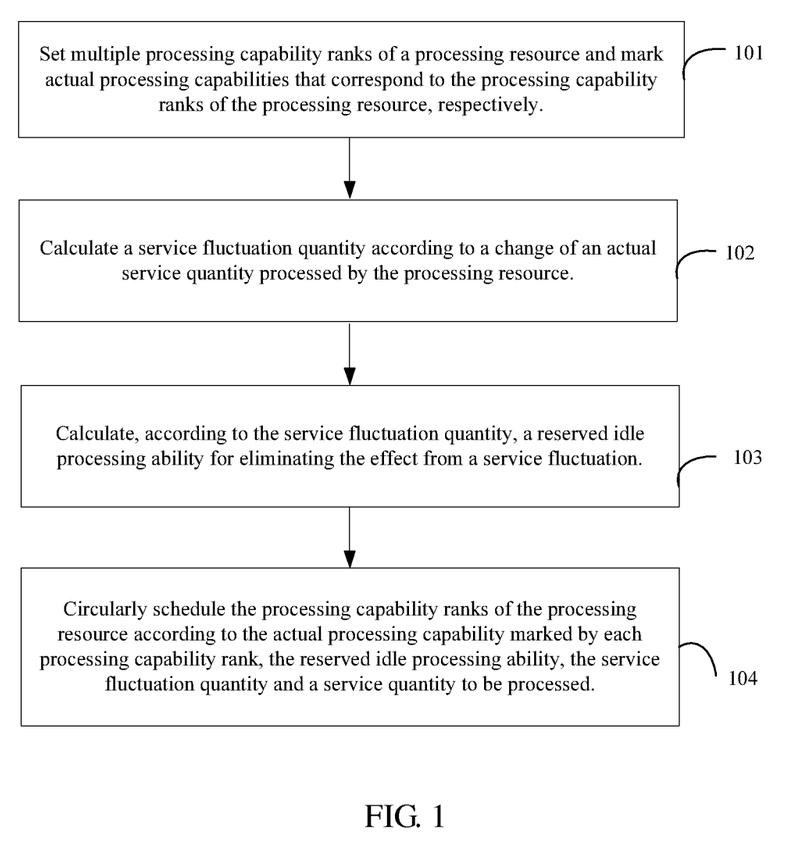
FIG. 1 is a schematic flowchart of a method for scheduling a service processing resource in a first embodiment of the present application.

Referring to FIG. 1, an embodiment of the present application provides a method for scheduling a service processing resource, and the method includes the following steps:

Step 101: Set multiple processing capability ranks of a processing resource and mark actual processing capabilities that correspond to the processing capability ranks of the processing resource, respectively.

Step 102: Calculate a service fluctuation quantity according to a change of an actual service quantity processed by the processing resource.

Step 103: Calculate, according to the service fluctuation quantity, a reserved idle processing capability for eliminating the effect from a service fluctuation.

Step 104: Circularly schedule the processing capability ranks of the processing resource according to the actual processing capability marked by each processing capability rank, the reserved idle processing capability, the service fluctuation quantity, and a service quantity to be processed.

The foregoing method for scheduling a service processing resource uses a mathematic statistical mean to calculate a service fluctuation quantity, and then properly selects appropriate proper reserved quantity of the processing resource based on the calculation result of the service fluctuation quantity, preventing drawbacks of experience judgment. A scientific statistical result is used as the basis for properly scheduling a service processing resource, preventing the impact on the network service processing capability due to insufficient processing capabilities caused by improper resource scheduling or a waste of processing resources due to excess processing capabilities.

Figure 2:
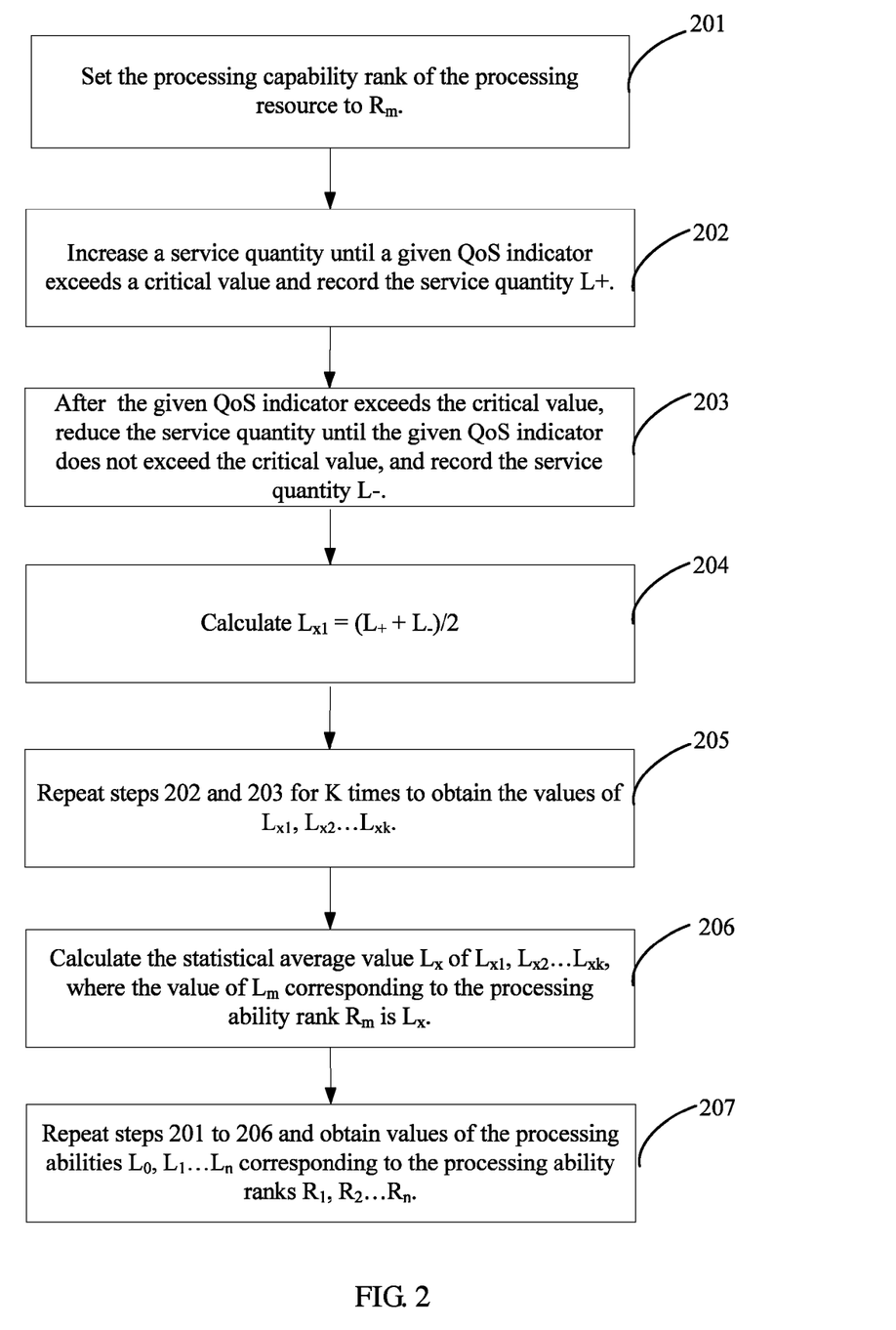
FIG. 2 is a schematic flowchart of a method for marking a processing capability in the first embodiment of the present application.

If the given QoS remains unchanged and the processing capability ranks of the processing resource are $R_0, R_1 \ldots R_m \ldots R_n$, and their corresponding actual processing capabilities are $L_0, L_1 \ldots L_m \ldots L_n$, the implementation for setting multiple processing capability ranks of a processing resource and marking actual processing capabilities that correspond to the processing capability ranks of the processing resource, respectively in step 101, includes the following, which is as shown in FIG. 2:

Step 201: Set the processing resource of a device to be tested to the processing capability rank $R_m$.

Step 202: Adjust a service quantity to enable the service quantity to slowly increase until a given QoS indicator reaches a critical value, and record the service quantity L.

The service quantity may be adjusted by adjusting a service generator. Observe the QoS indicator through a QoS check apparatus to determine the time when $L_+$ is recorded.

Step 203: Increase the service quantity so that the QoS indicator exceeds the critical value, adjust the service generator to slowly reduce the service quantity until the given QoS indicator does not exceed the critical value, and record the service quantity $L_-$.

Step 204: Calculate $L_{x1}=(L_+ + L_-)/2$.

Step 205: Repeat steps 202 and 203 for K times to obtain the values of $L_{x1}, L_{x2} \ldots L_{xk}$.

The value of the K is selected according to requirements of accuracy and operatability. In this embodiment, the value of K is 30.

Step 206: Calculate the statistical average value $L_x$ of $L_{x1}$, $L_{x2} \ldots L_{xk}$. The value of $L_m$ corresponding to the processing capability rank $R_m$ is $L_x$, that is, $L_m=L_x$.

Step 207: Repeat steps 201 to 206 for all processing capability ranks and obtain values of processing capabilities $L_0$, $L_1 \ldots L_n$ corresponding to processing capability ranks $R_1, R_2 \ldots R_n$, respectively.

It can be seen from the foregoing description that, generally, the method for setting a processing capability of a processing capability rank corresponding to a processing resource includes: for a processing capability rank of a processing resource, changing service quantities multiple times so that a given QoS indicator exceeds a critical value, and recording current service quantities to form a sequence; where the processing capability of the processing capability rank is equal to the mathematic average value of the sequence.

Because of various objective factors, for example, configuration differences of network elements on the communication network and individual differences, each processing capability rank has a certain overload capability for a service load. Therefore, after the mathematic average value of the foregoing sequence is obtained, the deviation and standard deviation of $L_x$ may be calculated. Finally, a standard deviation of a sequence of the processing capabilities of the processing capability ranks can be obtained and an overload capability $\Delta L_{r\_m}$ of the corresponding processing capability ranks is set to N times the standard deviation, where N is set to a certain value such as 1.5, 2, 2.5, 3, 3.5, or 4 according to actual situations and requirements. In this embodiment, N is set to 3. During actual statistical verification, it is found that the possibility that the overload capability $\Delta L_{r\_m}$ to which a certain processing capability rank corresponds to is three times the standard deviation or is less than 10%, which can be regarded as a small probability event.

The overload capability $\Delta L_{r\_m}$ indicates that the requirements of the QoS indicator are still met when an actual service quantity is one $\Delta L_{r\_m}$ smaller or larger than the marked service quantity $L_m$ for the processing capability rank $R_m$.

The embodiment also includes a learning and training process and a method for monitoring the live network to correct and improve the accuracy for marking a value of an actual processing capability corresponding to each processing capability rank.

The known processing capability ranks are $R_1, R_2 \ldots R_n$, and the initial values of corresponding processing capabilities are $L'_0, L'_1 \ldots L'_n$. The initial values $L'_0, L'_1 \ldots L'_n$ of the processing capabilities corresponding to the processing capability ranks may be original values marked by the device to be tested according to hardware resources or may be values marked through steps 201 to 207.

Figure 3:
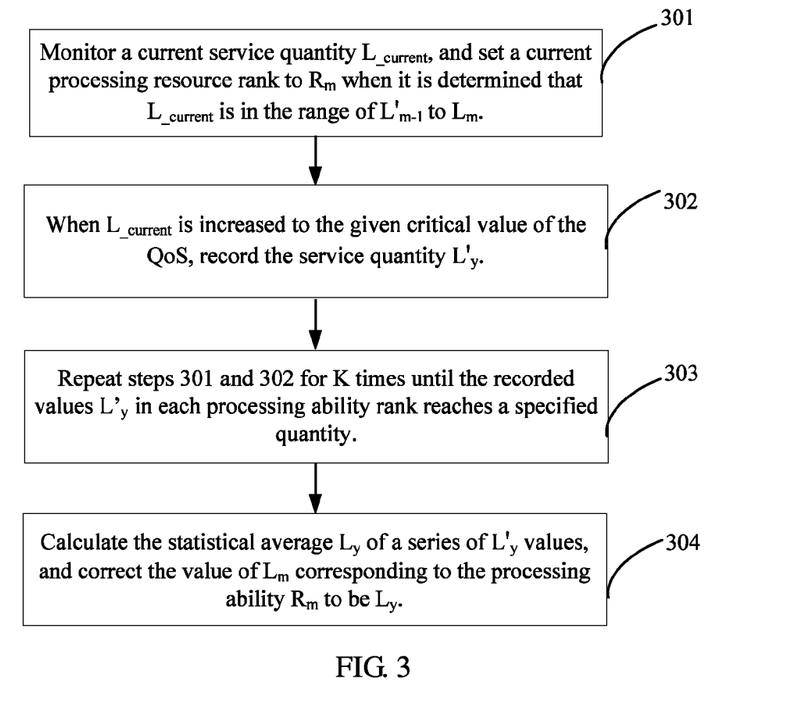
FIG. 3 is a schematic flowchart of a method for monitoring the live network in the first embodiment of the present application.

The learning and training process and the method for monitoring the live network on the live network includes the following, which is as shown in FIG. 3:

Step 301: Monitor a current service quantity $L\_current$, and compare $L\_current$ with the initial value of the processing capability of each processing capability rank. When it is determined that $L\_current$ is in the range $(L_{m-1}, L_m)$, set the current processing capability rank $R_m$.

Step 302: Observe the changes in service quantities and in QoS. When $L\_current$ is increased to the given critical value of the QoS, record the service quantity $L'_y$.

Step 303: Repeat steps 301 and 302 for K times until the recorded value $L'_y$ in each processing capability rank reaches a specified quantity.

A proper value is selected for the specified quantity according to requirements of accuracy and operatability. In this embodiment, the specified quantity may be 30.

Step 304: Calculate the statistical average $L_y$ of a series of the recorded values $L'_y$, and correct the actual processing capability $L_m$ corresponding to the processing capability rank $R_m$ to be $L_y$, that is, $Lm=Ly$.

Because of various objective factors, for example, configuration differences of network elements on the communication network and individual differences, each processing capability rank has a certain overload capability for a service load. Therefore, after the mathematic average value in step 304 is calculated, the deviation and standard deviation of the $L'_y$ sequence may be calculated. An overload capability $\Delta L_{r\_m}$ of the processing capability ranks is corrected to be N times the standard deviation, where N is set to a positive integer according to actual situations and requirements. In this embodiment, N is set to 3.

It can be seen from the foregoing description that, generally, the method for learning, training, and correcting the actual processing capabilities that correspond to the processing capability ranks of the processing resource, respectively, may include the following steps: setting a processing capability rank of the processing resource to $R_m$ and a processing capability corresponding to the processing capability rank to $L_m$; increasing a current service quantity multiple times for the processing capability rank $R_m$ until a QoS indicator exceeds a critical value, recording current service quantities to form a sequence of the service quantities; calculating and obtaining the mathematic average value and a standard deviation of the sequence of the service quantities, and correcting $L_m$ to make it be equal to the mathematic average value of the sequence of the service quantities, where an overload capability of the processing capability rank $R_m$ is N times the standard deviation of the sequence of the service quantities.

The corrected $L_m$ sequence is used to replace the initial sequence of the training process and the foregoing process is repeated. The marking process can run in real time on the live network to monitor the live network, to adapt to changes of network elements and usage scenarios, and to correct the marked initial values of the processing capabilities corresponding to the processing capability ranks.

The methods for calculating the service fluctuation quantity according to the service quantity change in step 102 include:

Method 1: Collect values of service quantities $L_1, L_2 \ldots L_q$ at Q time points and calculate the average value and standard deviation of the Q service quantities. The service fluctuation quantity $\Delta L$ is N times the standard deviation, and the value of N is 3 or 4.

Time points may be selected randomly according to the time unit of month, week, day, hour, or minute, or selected at intervals. The value of Q is an integer and is selected according to requirements. In this embodiment, the value of Q is 30.

Method 2: Collect average values $L_1, L_2 \ldots L_r$ of service quantities in past R time periods and combine these average values with average values of service quantities in a current time period to form a sequence of $L_1, L_2 \ldots L_r, L_{r+1}$. Calculate the average value and standard deviation of (R+1) sequences. The service fluctuation quantity $\Delta L$ is N times the standard deviation, and the value of N is 3 or 4.

Time periods may be selected randomly according to the month, week, day, hour, and minute or use intervals. The value of R is an integer and is selected according to requirements. In this embodiment, the value of R is 30.

Method 3: Compare the results of method 1 and method 2, and use larger values between the results as the final service fluctuation quantity $\Delta L$ and final service quantity average.

Figure 4:
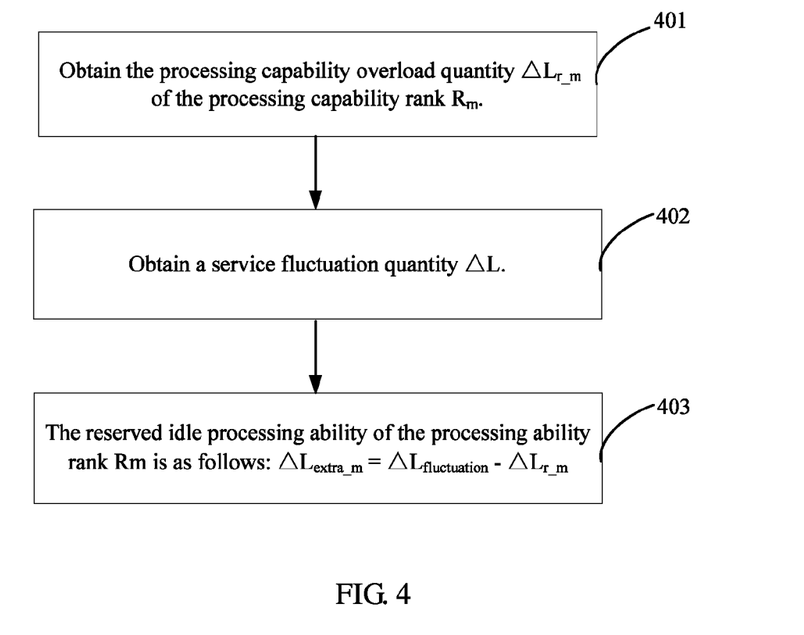
FIG. 4 is a schematic flowchart of a method for marking a processing capability that needs to be reserved in the first embodiment of the present application.
Figure 5:
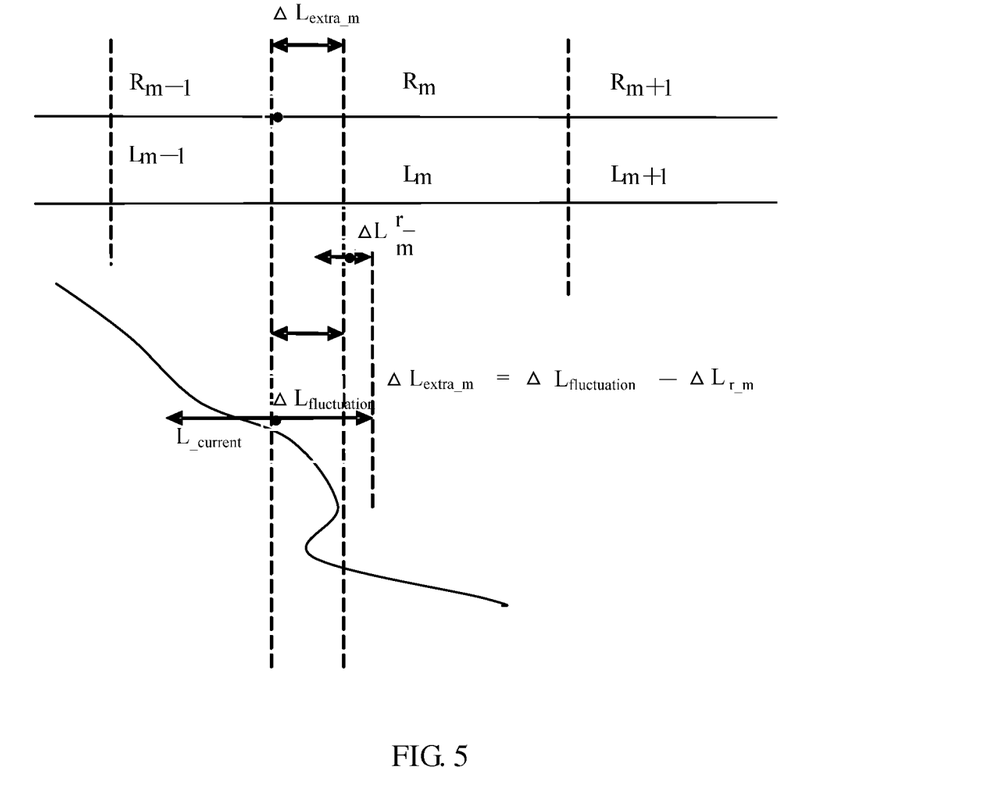
FIG. 5 is a schematic diagram of circularly scheduling resources in the first embodiment of the present application.

Referring to FIG. 4 and FIG. 5, a method for calculating, according to the service fluctuation quantity, the reserved idle processing capability for eliminating the effect from a service fluctuation in step 3 includes:

Step 401: Obtain the processing capability overload quantity $\Delta L_{r\_m}$ of the processing capability rank $R_m$ according to the calculation result in step 204 or 304.

Step 402: Obtain a service fluctuation quantity $\Delta L$ by using any one of the three methods for calculating the service fluctuation quantity $\Delta L$.

Step 403: Calculate the reserved idle processing capability for the processing capability rank $R_m$ using the formula: $\Delta L_{extra\_m} = L_{fluctuation} - \Delta L_{r\_m}$.

For the effect of the actual service fluctuation quantity, each processing capability rank of a processing resource of a device must be set with the reserved idle processing capability $\Delta L_{extra\_m}$. The reserved idle processing capability $\Delta L_{extra\_m}$ can be used to calculate the number of reserved idle boards or processing channels corresponding to each processing capability rank in each usage scenario. For the processing capability rank $R_m$, the required processing capability of the processing resource is $L_m$, including the processing resource or channel that corresponds to $\Delta L_{extra\_m}$ and retains in an idle state. The processing resource corresponding to the remaining extra processing capabilities ($L_n - L_m$) can be disabled to achieve self-learning and self-adaptation, ensuring service quality and achieving the best energy saving effect.

Figure 6:
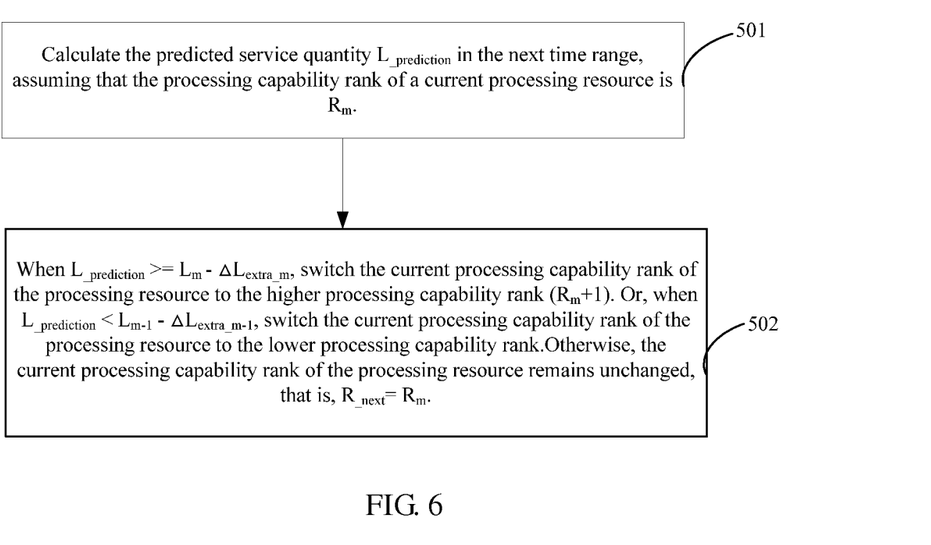
FIG. 6 is a schematic diagram of a process of circularly scheduling resources in the first embodiment of the present application.

As shown in FIG. 5 and FIG. 6, in step 104 where processing capability ranks of a processing resource are circularly scheduled according to the actual processing capability marked by each processing capability rank, reserved idle processing capability, service fluctuation quantity, and service quantity to be processed, the service quantity to be processed can be the predicted service quantity $L_{\_prediction}$ in the next time period or the service quantity in the current time period. The step for circularly scheduling the processing capability ranks of a processing resource includes:

Step 501: Calculate the predicted service quantity $L_{\_prediction}$ in the next time period, assuming that a current processing resource rank is $R_m$.

Step 502: When it is determined circularly that $L_{\_prediction} \geq L_m - \Delta L_{extra\_m}$, switch the current processing capability rank of the processing resource to a higher processing capability rank ($R_m+1$). Or, when $L_{\_prediction} < L_{m-1} - \Delta L_{extra\_m-1}$, switch the current processing capability rank of the processing resource to a lower processing capability rank. When $L_{prediction} \geq L_m - \Delta L_{extra\_m}$, the current processing capability rank of the processing resource remains unchanged, that is, R_next=$R_m$.

It can be seen from the foregoing description that the step for circularly scheduling the processing capability ranks of a processing resource may include: circularly determining whether the service quantity to be processed is larger than $L_{m-1}$ and smaller than $L_m$ for any two neighboring processing capability ranks $R_m$ and $R_{m-1}$ and corresponding processing capabilities being $L_m$ and $L_{m-1}$; changing a value of m if the service quantity to be processed is not larger than $L_{m-1}$ and not smaller than $L_m$; setting the current processing capability rank of the processing resource to $R_m$ if the service quantity to be processed is larger than $L_{m-1}$ and smaller than $L_m$.

The method for scheduling a processing resource uses a mathematic statistical mean to calculate the service fluctuation quantity, and then properly selects a proper reserved idle processing capability of each processing capability rank based on the calculation result of the service fluctuation quantity. This method ensures sufficient service processing capabilities and prevents a waste of processing resources due to excess processing capability, implements self-adaptability between the resource and the load to meet certain QoS requirements, and achieves the best energy saving effect.

In addition, the foregoing QoS parameters can be leveled. The QoS with different levels applies to the foregoing methods for scheduling a processing resource, respectively. When changing the QoS levels causes a change of a processing capability of each processing capability rank of the processing resource, the foregoing methods for scheduling a processing resource may be used to mark the processing capability of each processing capability rank, and processing capability ranks of the processing resource are circularly scheduled according to the service fluctuation quantity and service quantity.

Figure 7:
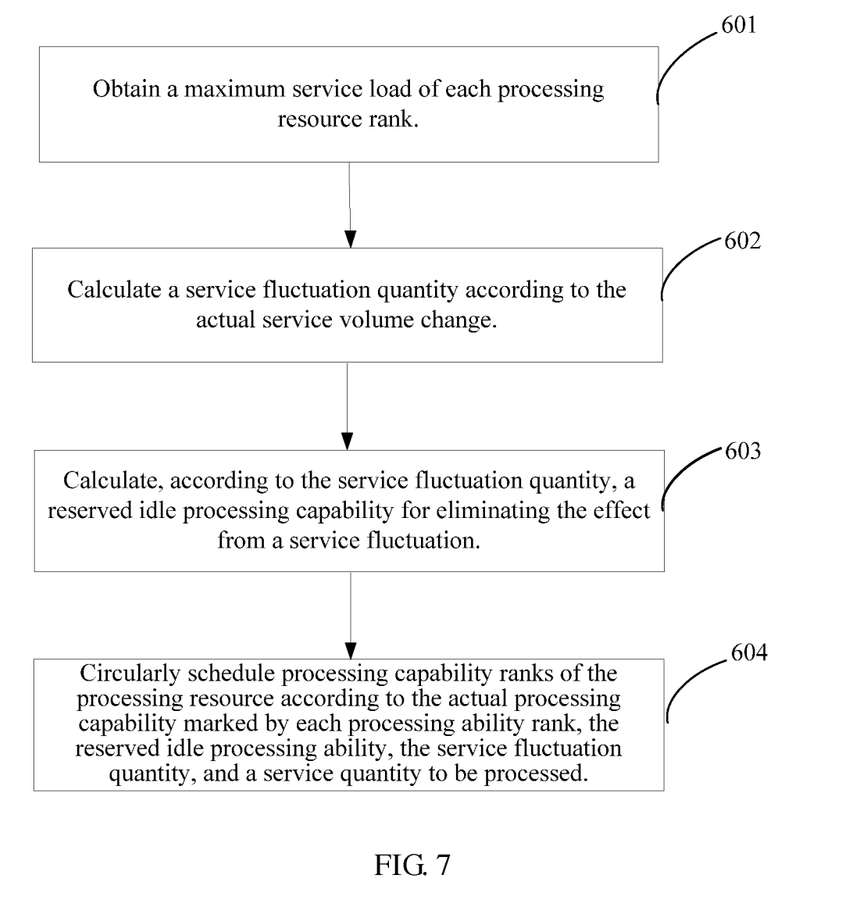
FIG. 7 is a schematic diagram of a method for scheduling a service processing resource in a second embodiment of the present application.

Referring to FIG. 7, an embodiment of the present application provides a method for scheduling a service processing resource, and with given QoS, the method includes the following steps:

Step 601: Obtain a maximum service load of each processing resource rank.

Step 602: Calculate a service fluctuation quantity according to a change of an actual service quantity.

Step 603: Obtain, according to the service fluctuation quantity, a reserved idle processing capability for eliminating the effect from a service fluctuation.

Step 604: Circularly schedule the processing capability ranks of the processing resource according to the maximum service load of each processing resource rank, the reserved idle processing capability, the service fluctuation quantity, and a service quantity to be processed.

Each processing resource rank in step 601 corresponds to a processing capability rank of each processing resource in step 101 in the first embodiment of the present application, and a maximum service load of each processing resource rank corresponds to the actual processing capability marked by each processing capability rank in step 101 in the first embodiment of the present application.

In this embodiment, the processing capability ranks of the processing resource in the first embodiment of the present application are set to the processing resource ranks, and the maximum service loads corresponding to the processing resource ranks or processing capability ranks are equal to the sums of the processing capabilities of the processing capability ranks and the overload capabilities, that is, $L_{m\_max} = L_m + \Delta L_{r\_m}$.

Figure 8:
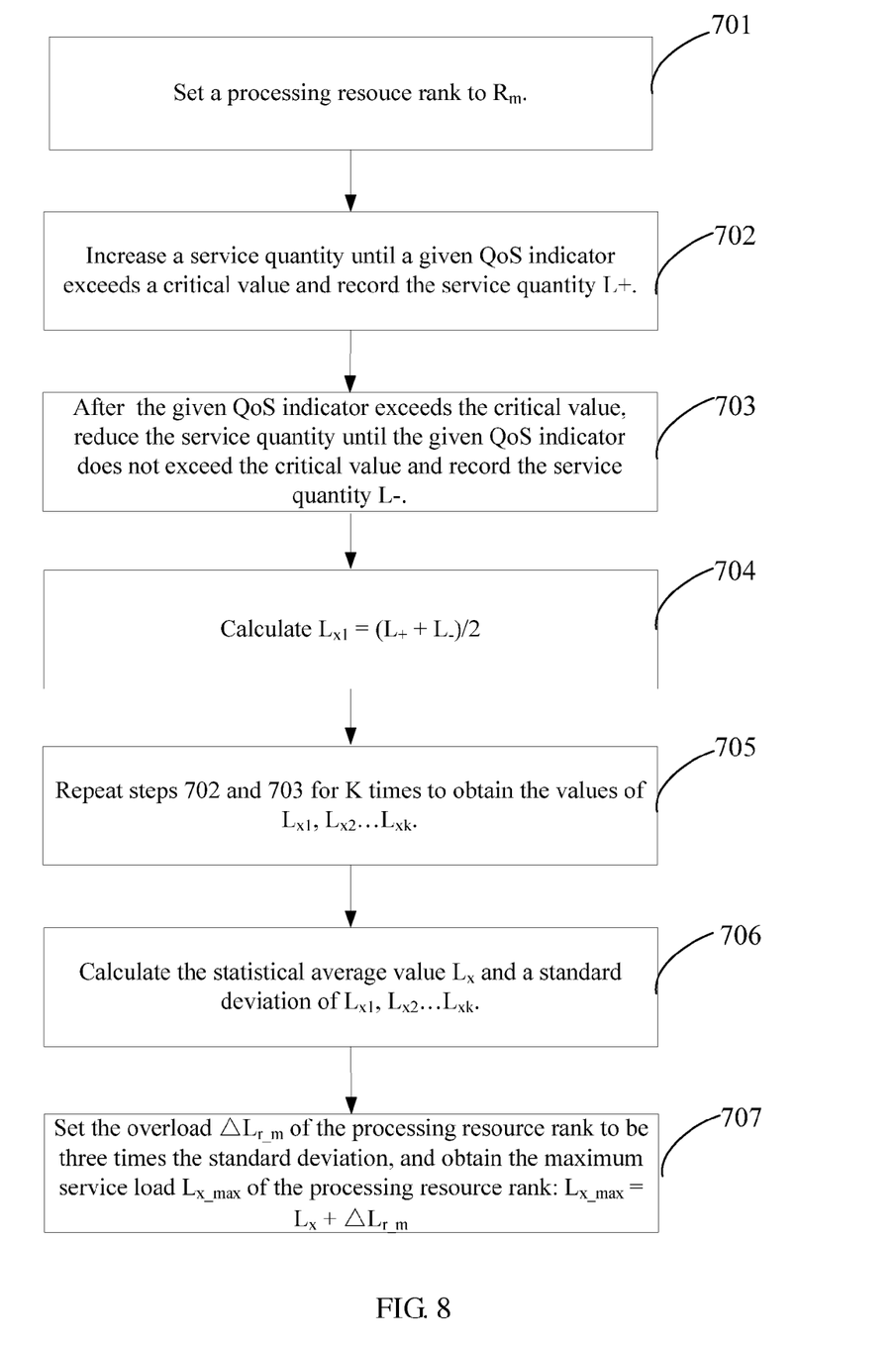
FIG. 8 is a schematic diagram of a process of obtaining a maximum service load of each processing resource rank in the second embodiment of the present application.

If the given QoS remains unchanged and the processing resource ranks or the processing capability ranks are $R_1, R_m \ldots R_n$ and their corresponding maximum service loads are $L_{1\_max}, L_{m\_max} \ldots L_{n\_max}$, the method for obtaining the maximum service loads that correspond to the processing resource ranks, respectively, in step 601, includes the following which is as shown in FIG. 8:

Step 701: Set the processing resource rank $R_m$ of the processing resource of a device to be tested.

Step 702: Adjust a service quantity to enable the service quantity to slowly increase until a given QoS indicator reaches a critical value, and record the service quantity $L_+$.

The service quantity may be adjusted by adjusting a service generator. Observe the QoS indicator through a QoS check apparatus to determine the time when $L_+$ is recorded.

Step 703: Increase the service quantity so that the QoS indicator exceeds the critical value, adjust the service generator to slowly reduce the service quantity until the given QoS indicator does not exceed the critical value, and record the service quantity $L_-$.

Step 704: Calculate $L_{x1}=(L_++L_-)/2$.

Step 705: Repeat steps 702 and 703 for K times to obtain the values of $L_{x1}, L_{x2} \ldots L_{xk}$.

The value of the K is selected according to requirements of accuracy and operatability. In this embodiment, the value of K is 30.

Step 706: Calculate the statistical average value $L_x$ and a standard deviation of $L_{x1}, L_{x2} \ldots L_{xk}$.

Step 707: Repeat steps 701 to 706 for all processing capability ranks and obtain the statistical average value $L_x$ and standard deviation of each processing capability rank. Set an overload $\Delta L_{r\_m}$ of each processing resource rank to be three times the standard deviation of the statistical average value of the service load corresponding to the processing resource rank, and obtain the maximum service load $L_{x\_max}$ of each processing resource rank: $L_{x\_max}=L_x+\Delta L_{r\_m}$.

Generally, the method for marking the maximum service loads that correspond to the processing capability ranks of the processing resource, respectively, includes: setting a processing capability rank of the processing resource, changing service quantities multiple times so that a given QoS indicator exceeds a critical value, and recording current service quantities to form a sequence; and calculating and obtaining the mathematic average value and a standard deviation of the foregoing sequence, where a maximum service load that corresponds to the processing resource rank is equal to the mathematic average value of the sequence plus N times the standard deviation.

The embodiment also includes a learning and training process on the live network and a method for monitoring the live network to correct and improve the accuracy for marking a value of a maximum service load corresponding to each processing capability rank or processing resource rank.

The known processing capability ranks or processing resource ranks are $R_1, R_2 \ldots R_n$, and the initial values of corresponding maximum service loads are $L'_{1\_max} \ldots L'_{n\_max}$. The initial values $L'_{1\_max} \ldots L'_{n\_max}$ of the processing capabilities corresponding to the processing capability ranks may be original values marked by the device to be tested according to hardware resources or may be values marked through steps 701 to 707.

Figure 9:
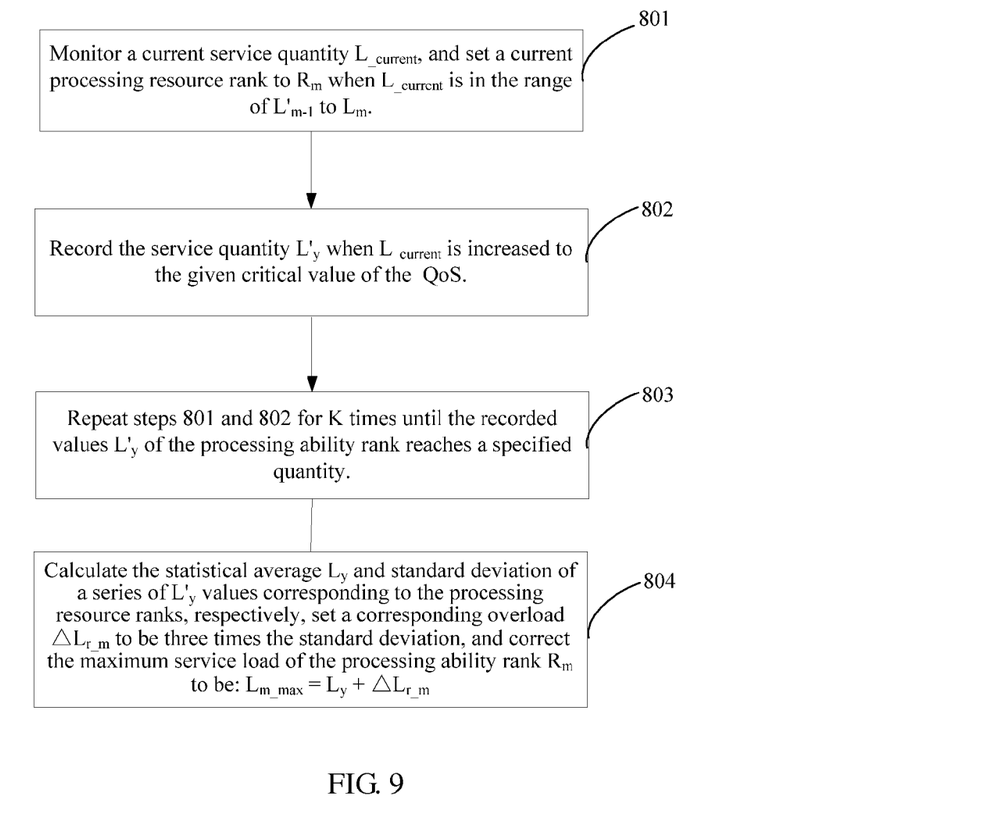
FIG. 9 is a schematic flowchart of a method for monitoring the live network in the second embodiment of the present application.

As shown in FIG. 9, the learning and training process on the live network and the method for monitoring the live network include:

Step 801: Monitor a current service quantity $L_{\_current}$, and compare $L_{\_current}$ with the initial value of the processing capability of the processing resource rank. When it is determined that $L_{\_current}$ is in the range $(L'_{m-1}, L_m)$, set the current processing resource rank to $R_m$.

Step 802: Observe the changes in service quantities and in QoS. When $L_{\_current}$ is increased to the given critical value of the QoS, record the service quantity $L'_y$.

Step 803: Repeat steps 801 and 802 for K times until the recorded value $L'_y$ in each processing capability rank reaches a specified quantity.

A proper value is selected for the specified quantity according to requirements of accuracy and operatability. In this embodiment, the specified quantity may be 30.

Step 804: Calculate the statistical average $L_y$ and standard deviation of a series of $L_m$ values corresponding to the processing resource ranks, respectively, set a corresponding overload $\Delta L_{r\_m}$ to be three times the standard deviation, and correct the maximum service load of the processing capability rank $R_m$ to be: $L_{m\_max}=L_y+\Delta L_{r\_m}$.

Generally, the method for learning, training, and correcting the maximum service loads that correspond to the processing resource ranks, respectively, may include: setting a processing resource rank to $R_m$ and a corresponding maximum service load to $L_{m\_max}$; increasing a current service quantity multiple times for the processing resource rank $R_m$ until a QoS indicator exceeds a critical value, and recording current service quantities to form a sequence of the service quantities; and calculating and obtaining the mathematic average value and a standard deviation of the service quality sequence, and correcting $L_{m\_max}$ to make it be equal to the mathematic average value of the sequence plus N times the standard deviation.

The corrected $L_{m\_max}$ sequence is used to replace the initial sequence of the training process and the foregoing process is repeated. The process can be run in real time on the live network to monitor the live network, to adapt to changes of network elements and usage scenarios, and to correct the initial values of the maximum service loads corresponding to the processing capability ranks.

The method for calculating the service fluctuation quantity in step 602 is the same as the method for calculating the service fluctuation quantity in step 102 in the first embodiment of the present application.

During the process of calculating, according to the service fluctuation quantity and the maximum service load of each resource rank, the reserved idle processing capability for eliminating the effect from a service fluctuation in step 603, directly use the reserved idle processing capability as the service fluctuation, that is, the reserved idle processing capability of the processing capability rank $R_m$ is as follows: $\Delta L_{extra\_m}=\Delta L_{fluctuation}$.

Figure 10:
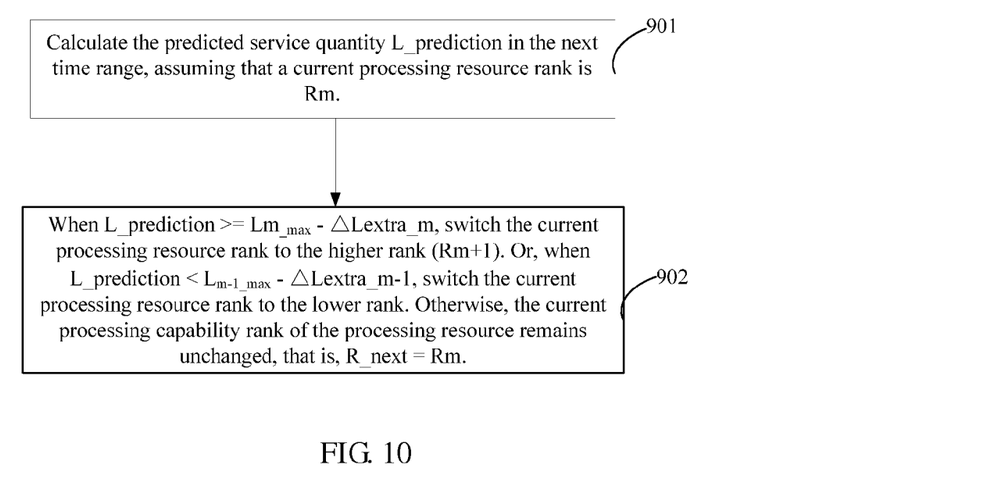
FIG. 10 is a schematic diagram of a process of scheduling a resource processing rank in the second embodiment of the present application.

In step 604, the service quantity to be processed may be the predicted service quantity $L_{\_prediction}$ in a next time period or the service quantity in a current time period, and the step of circularly scheduling the processing capability ranks of a processing resource includes the following which is as shown in FIG. 10:

Step 901: Calculate the predicted service quantity $L_{\_prediction}$ in the next time period, assuming that a current processing resource rank is $R_m$.

Step 902: When is determined circularly that $L_{\_prediction}>=L_{m\_max}-L_{extra\_m}$, switch the current processing capability rank of the processing resource to a higher processing capability rank $(R_m+1)$. Or, when $L_{\_prediction}<L_{m-1\_max}-\Delta L_{extra\_m-1}$, switch the current processing capability rank of the processing resource to a lower processing capability rank. When $L_{\_prediction}>=L_{m-1\_max}-\Delta L_{extra\_m-1}$ the current processing capability rank of the processing resource remains unchanged, that is, $R\_next=R_m$.

In addition, the foregoing QoS parameters can be leveled. The QoS with different levels applies to the foregoing methods for scheduling a processing resource, respectively. When changing the QoS levels causes a change of each rank of the processing resource or the maximum service load of a processing capability rank, the foregoing methods for scheduling a processing resource may be used to mark each processing capability rank or processing resource rank, and processing capability ranks or ranks of the processing resource are circularly scheduled according to the service fluctuation quantity and service quantity.

Figure 11:
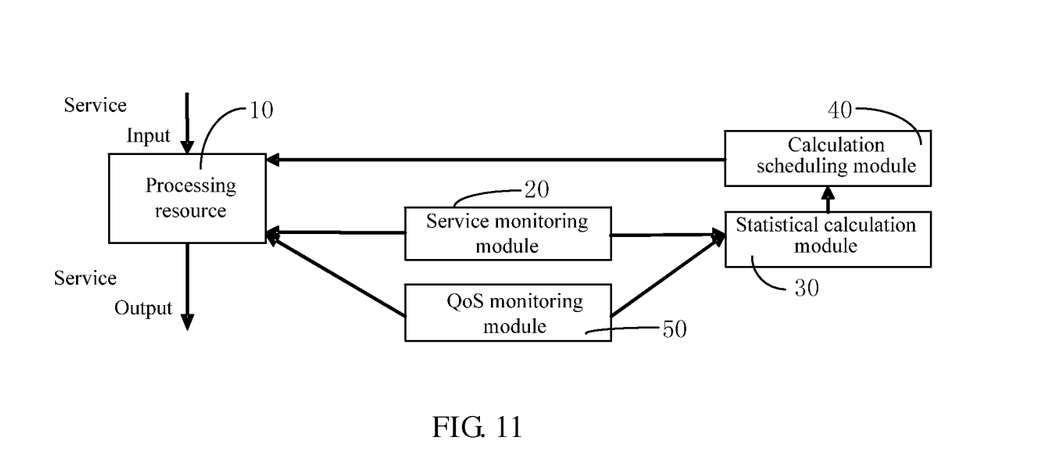
FIG. 11 is a schematic diagram of an apparatus for scheduling a service processing resource in a third embodiment of the present application.

Referring to FIG. 11, an embodiment of the present application provides an apparatus for scheduling a service processing resource, including a processing resource module 10, a service monitoring module 20, a statistical calculation module 30, and a calculation scheduling module 40. The statistical calculation module 30 is configured to mark each processing capability rank of the processing resource module 10 and an actual processing capability corresponding to each processing capability rank according to service data collected by the service monitoring module 20. The statistical calculation module 30 is configured to calculate a service fluctuation quantity according to service quantity change data collected by the service monitoring module, and calculate, according to the service fluctuation quantity, a reserved idle processing capability for eliminating the effect from a service fluctuation. The calculation scheduling module 40 is configured to circularly schedule the processing capability ranks of the processing resource module 10 according to the actual processing capability marked by each processing capability rank, the reserved idle processing capability, the service fluctuation quantity, and a service quantity to be processed.

The statistical calculation module 30 is configured to subtract an overload capability of the processing capability rank from the service fluctuation quantity to obtain the reserved idle processing capability.

The statistical calculation module 30 is configured to calculate a standard deviation of the sequence of service quantities collected by a service monitoring module at each time point or time period, where the service fluctuation quantity is an integral number of times of the standard deviation.

The apparatus for scheduling a service processing resource further includes a QoS monitoring module 50. When a processing capability of any processing capability rank of a processing resource module 10 is marked and the QoS monitoring module 50 detects that a given QoS indicator exceeds a critical value by changing service quantities once or multiple times, the QoS monitoring module is configured to record current service quantities to form a service quantity value or a sequence, and use the service quantity value or the average value of the sequence as the processing capability corresponding to the processing capability rank of the processing resource module 10.

The overload capability of the processing capability rank is in proportion to the standard deviation of the sequence of the service quantities.

For any two neighboring processing capability ranks $R_m$ and $R_{m-1}$ and the corresponding processing capabilities being $L_m$ and $L_{m-1}$, when the calculation scheduling module 40 circularly schedules the processing capability ranks of the processing resource module 10, the calculation scheduling module 40 is configured to circularly determine whether the service quantity to be processed is larger than $L_{m-1}$ and smaller than $L_m$.

If the service quantity to be processed is not larger than $L_{m-1}$ and not smaller than $L_m$, the calculation scheduling module 40 is configured to change a value of m.

If the service quantity to be processed is larger than $L_{m-1}$ and smaller than $L_m$, the calculation scheduling module 40 is configured to set a current processing capability rank of the processing resource to $R_m$.

The processing resource module 10 in the third embodiment of the present application is a hardware unit composed of electronic components that include chips and processing boards. Other modules such as the service monitoring module 20, the statistical calculation module 30, the calculation scheduling module 40, and the QoS monitoring module 50 are also hardware units composed of relevant electronic components. The hardware units run specified computer programs and cooperate with each other to implement resource scheduling in the embodiments of the present application.

The communications system provided in the embodiments of the present application is introduced in detail, specific examples are applied in the specification to illustrate principles and implementations of the present application, and the illustration of the embodiments is only used to help in understanding the method and core idea of the present application. Persons of ordinary skill in the art may make variations on specific implementations and application scopes according to the idea of the present application. In view of the foregoing, the content of the specification should not be understood as the limit to the present application.

What is claimed is:

1. A method for scheduling a service processing resource, comprising:
    setting multiple processing capability ranks of a processing resource and marking actual processing capabilities that correspond to the processing capability ranks of the processing resource, wherein the processing capability ranks are preset series of values $R_0, R_1, \ldots R_n$ which are, respectively corresponding to multiple discretely distributed processing capability sequences $L_0, L_1, \ldots L_n$, wherein a higher processing capability rank indicates a larger processing capability, and wherein marking the actual processing capabilities that correspond to the processing capability ranks comprises determining the processing sequences $L_0, L_1, \ldots L_n$ for the multiple processing capability ranks;
    calculating a service fluctuation quantity according to a change of an actual service quantity processed by the processing resource;
    calculating, according to the service fluctuation quantity, a reserved idle processing capability for eliminating an effect from a service fluctuation; and
    scheduling the processing capability ranks of the processing resource according to the actual processing capability marked by each processing capability rank, wherein the reserved idle processing capability, the service fluctuation quantity, and a service quantity are to be processed, wherein scheduling the processing capability ranks of the processing resource comprises:
        determining whether the service quantity to be processed is larger than $L_{m-1}$ and smaller than $L_m$ for any two neighboring processing capability ranks $R_m$ and $R_{m-1}$ and corresponding maximum service loads being $L_m$ and $L_{m-1}$;
        setting a current processing capability rank of the processing resource to Rm when the service quantity to be processed is larger than Lm−1 and smaller than Lm; and
        changing a value of m when the service quantity to be processed is not larger than Lm−1 and smaller than Lm.

2. The method according to claim 1, wherein the reserved idle processing capability is an overload capability of the processing capability rank subtracted from the service fluctuation quantity.

3. The method according to claim 2, wherein the service fluctuation quantity is N times a standard deviation of a sequence of service quantities at multiple time points.

4. The method according to claim 2, wherein calculating the service fluctuation quantity comprises calculating a standard deviation of an average value sequence that is formed by an average value of service quantities in past several time points and an average value of a service quantity in a current time period, wherein the service fluctuation quantity is N times the standard deviation.

5. The method according to claim 2, wherein calculating the service fluctuation quantity comprises:
    obtaining a first standard deviation of a sequence of service quantities at multiple time points; and obtaining a second standard deviation of an average value sequence that is formed by an average value of service quantities in past several time points and an average value of a service quantity in a current time period, wherein the service fluctuation quantity is N times a larger value between the first standard deviation and the second standard deviation.

6. The method according to claim 3, wherein a number of the time points or time periods is 30, and wherein the time points or time periods are selected randomly according to a time unit of month, week, day, hour, or minute, or selected at intervals.

7. The method according to claim 2, wherein setting the multiple processing capability ranks of the processing resource and marking the actual processing capabilities that correspond to the processing capability ranks of the processing resource comprises:
setting the processing resource to a processing capability rank, changing service quantities multiple times so that a given Quality of Service (QoS) indicator exceeds a critical value and recording current service quantities to form a sequence, and wherein a processing capability corresponding to the processing capability rank is equal to a mathematic average value of the sequence.

8. The method according to claim 7, wherein the overload capability of the processing capability rank is N times a standard deviation of the sequence.

9. The method according to claim 7, further comprising learning, training, and correcting the actual processing capabilities that correspond to the processing capability ranks of the processing resource by:
setting a processing capability rank of the processing resource to $R_m$, wherein a processing capability corresponding to the processing capability rank is $L_m$;
increasing a current service quantity multiple times for the processing capability rank $R_m$ until the QoS indicator exceeds the critical value;
recording the current service quantities to form a sequence of the service quantities;
obtaining the mathematic average value and a standard deviation of the sequence of the service quantities; and
correcting the $L_m$ to make it be equal to the mathematic average value of the sequence of the service quantities, wherein an overload capability of the processing capability rank $R_m$ is N times the standard deviation of the sequence of the service quantities.

10. The method according to claim 1, wherein the service quantity to be processed is a predicted service quantity in a next time period or the service quantity in a current time period.

11. The method according to claim 1, wherein the reserved idle processing capability is the service fluctuation quantity.

12. The method according to claim 11, wherein the processing capability ranks of the processing resource that correspond to processing resource ranks and the actual processing capabilities that correspond to the processing capability ranks of the processing resource correspond to maximum service loads that correspond to the processing capability ranks of the processing resource.

13. The method according to claim 12, wherein marking the maximum service loads that correspond to the processing capability ranks of the processing resource comprises:
setting a processing capability rank to the processing resource;
changing service quantities multiple times so that a given QoS indicator exceeds a critical value;
recording current service quantities to form a sequence; and
obtaining a mathematic average value and a standard deviation of the sequence,
wherein a maximum service load that corresponds to the processing resource rank is equal to the mathematic average value of the sequence plus N times the standard deviation.

14. The method according to claim 13, further comprising learning, training, and correcting the maximum service loads that correspond to the processing capability ranks of the processing resource by:
setting a processing resource rank to $R_m$ and a maximum service load that corresponds to the processing resource rank to Lm_max;
increasing a current service quantity multiple times for the processing resource rank $R_m$ until the QoS indicator exceeds the critical value;
recording the current service quantities to form a sequence of the service quantities;
obtaining the mathematic average value and a standard deviation of the sequence of the service quantities; and
correcting Lm_max to make it be equal to the mathematic average value of the sequence of the service quantities plus N times the standard deviation.

15. The method according to claim 3, wherein N is 3.

16. The method according to claim 2, wherein initial values $L'_0, L'_1 \ldots L'_n$ of the processing capabilities sequences $L_0, L_1, \ldots L_n$ corresponding to the processing capability ranks $R_0, R_1, \ldots R_n$ are original values marked by a device to be tested according to hardware resources.

17. The method according to claim 1, wherein calculating, according to the service fluctuation quantity, the reserved idle processing capability for eliminating the effect from the service fluctuation comprises:
obtaining a processing capability overload quantity $\Delta L_{r\_m}$ of the processing capability rank $R_m$, wherein an overload capability $\Delta L_{r\_m}$ indicates that requirements of a Quality of Service (QoS) indicator are still met when an actual service quantity is one $\Delta L_{r\_m}$ smaller or larger than the service quantity $L_m$ for the processing capability rank $R_m$;
obtain a service fluctuation quantity $\Delta L$; and
calculating the reserved idle processing capability for the processing capability rank $R_m$ using the formula: $\Delta L_{extra\_m} = \Delta L_{fluctuation} - \Delta L_{r\_m}$.

18. The method according to claim 17, wherein setting multiple processing capability ranks of the processing resource and marking the actual processing capabilities that correspond to the processing capability ranks of the processing resource comprises:
setting the processing resource to a processing capability rank; and
changing service quantities multiple times so that a given Quality of Service (QoS) indicator exceeds a critical value and recording current service quantities to form a sequence, and
wherein a processing capability corresponding to the processing capability rank is equal to a mathematic average value of the sequence, and wherein the processing capability overload quantity $\Delta L_{r\_m}$ is N times a standard deviation of the sequence.

19. The method according to claim 1, wherein changing the value of m comprises switching the current processing capability rank of the processing resource to a higher processing capability rank $R_{m+1}$ when it is determined that the service quantity to be processed $L_{\_prediction} \geq L_m - \Delta L_{extra\_m}$, wherein the $\Delta L_{extra\_m}$ indicates the reserved idle processing capability.

20. The method according to claim 1, wherein changing the value of m comprises switching the current processing capability rank of the processing resource to a lower processing capability rank $R_{m-1}$ when it is determined that the service quantity to be processed $L_{\_prediction} < L_{m-1} - \Delta L_{extra\_m}$, wherein the $\Delta L_{extra\_m}$ indicates the reserved idle processing capability.

21. The method according to claim 1, wherein the method is applied to processing resources with different levels of QoS parameters.

22. A computer system for scheduling a service processing resource, comprising:
   a memory for storing software program; and
   a central processing unit (CPU) for reading the software program from the memory to execute the steps of:
      setting multiple processing capability ranks of a processing resource and marking actual processing capabilities that correspond to the processing capability ranks of the processing resource, wherein the processing capability ranks are preset series of values $R_0, R_1, \ldots R_n$ which are, respectively, corresponding to multiple discretely distributed processing capability sequences $L_0, L_1, \ldots L_n$, and wherein a higher processing capability rank indicates a larger processing capability, and wherein marking the actual processing capabilities that correspond to the processing capability ranks comprises determining the processing sequences $L_0, L_1, \ldots L_n$, for the multiple processing capability ranks;
      calculating a service fluctuation quantity according to a change of an actual service quantity processed by the processing resource;
      calculating, according to the service fluctuation quantity, a reserved idle processing capability for eliminating an effect from a service fluctuation; and
      scheduling the processing capability ranks of the processing resource according to the actual processing capability marked by each processing capability rank, wherein the reserved idle processing capability, the service fluctuation quantity, and a service quantity are to be processed, and wherein scheduling the processing capability ranks of the processing resource comprises:
         determining whether the service quantity to be processed is larger than $L_{m-1}$ and smaller than $L_m$ for any two neighboring processing capability ranks $R_m$ and $R_{m-1}$ and corresponding maximum service loads being $L_m$ and $L_{m-1}$;
         setting a current processing capability rank of the processing resource to $R_m$ when the service quantity to be processed is larger than $L_{m-1}$ and smaller than $L_m$; and
         changing a value of m when the service quantity to be processed is not larger than $L_{m-1}$ and smaller than $L_m$.

* * * * *